(12) United States Patent
Todd et al.

(10) Patent No.: US 11,481,740 B1
(45) Date of Patent: Oct. 25, 2022

(54) DISTRIBUTED LEDGER FOR PEER-TO-PEER CLOUD DATA ASSET VALUATION

(71) Applicant: EMC IP Holding Company LLC, Hopkinton, MA (US)

(72) Inventors: Stephen Todd, Shrewsbury, MA (US); Robert A. Lincourt, Jr., Pawtucket, RI (US); Misha Nossik, Ottawa (CA); Lejin Du, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 506 days.

(21) Appl. No.: 15/496,464

(22) Filed: Apr. 25, 2017

(51) Int. Cl.
*G06Q 20/06* (2012.01)
*H04L 9/40* (2022.01)
(Continued)

(52) U.S. Cl.
CPC ..... *G06Q 20/0655* (2013.01); *G06F 12/1408* (2013.01); *G06Q 20/223* (2013.01); *H04L 9/0618* (2013.01); *H04L 63/0281* (2013.01); *H04L 63/0853* (2013.01); *G06F 2212/1052* (2013.01)

(58) Field of Classification Search
CPC .............. G06Q 20/0655; G06Q 20/223; G06F 12/1408; H04L 9/0618
See application file for complete search history.

(56) References Cited

U.S. PATENT DOCUMENTS 10,210,551 B1 * 2/2019 Todd .................. G06Q 30/0278
11,128,437 B1 * 9/2021 Nossik .................. H04L 9/0637
(Continued)

FOREIGN PATENT DOCUMENTS

WO WO-2017145020 A1 * 8/2017 ........... G06F 16/137

OTHER PUBLICATIONS

V. Chang, G. Wills and D. De Roure, "A Review of Cloud Business Models and Sustainability," 2010 IEEE 3rd International Conference on Cloud Computing, 2010, pp. 43-50, doi: 10.1109/CLOUD. 2010.69. (Year: 2010).*

(Continued)

*Primary Examiner* — Neha Patel
*Assistant Examiner* — Jahed Ali
(74) *Attorney, Agent, or Firm* — Ryan, Mason & Lewis, LLP

(57) ABSTRACT

An apparatus comprises at least one processing device having a processor coupled to a memory. The processing device is configured to implement a first ledger node of a first cloud. The first ledger node of the first cloud is configured to communicate over one or more networks with a plurality of additional ledger nodes associated with respective additional clouds. The first ledger node is further configured to obtain a transaction associated with a valuation of a data asset. The first ledger node is further configured to broadcast the valuation transaction to the additional ledger nodes. A cryptographic block characterizing at least the valuation transaction is generated and entered into a blockchain distributed ledger collectively maintained by the first and additional ledger nodes. The first and additional ledger nodes collectively maintain the blockchain distributed ledger on a peer-to-peer basis without utilizing a centralized transaction authority.

20 Claims, 8 Drawing Sheets

(51) Int. Cl.
*H04L 9/06* (2006.01)
*G06F 12/14* (2006.01)
*G06Q 20/22* (2012.01)

(56) References Cited

U.S. PATENT DOCUMENTS

| | | | | |
|---|---|---|---|---|
| 2005/0283417 | A1* | 12/2005 | Miles | G06Q 30/08 |
| | | | | 705/35 |
| 2008/0004893 | A1* | 1/2008 | Graboske | G06Q 30/0278 |
| | | | | 705/306 |
| 2010/0318528 | A1* | 12/2010 | Kupershmidt | G16B 30/00 |
| | | | | 707/769 |
| 2011/0173093 | A1* | 7/2011 | Psota | G06Q 40/02 |
| | | | | 705/26.35 |
| 2013/0054634 | A1* | 2/2013 | Chakraborty | H04L 67/1091 |
| | | | | 707/769 |
| 2013/0268459 | A1* | 10/2013 | Jacobek | G06Q 40/06 |
| | | | | 705/36 R |
| 2014/0095372 | A1* | 4/2014 | Nash | G06Q 40/04 |
| | | | | 705/37 |
| 2014/0279573 | A1* | 9/2014 | Coats | G06Q 30/0278 |
| | | | | 705/306 |
| 2015/0120373 | A1* | 4/2015 | Bajaj | G06Q 10/06315 |
| | | | | 705/7.25 |
| 2016/0197988 | A1* | 7/2016 | Prasad | G06F 16/258 |
| | | | | 709/202 |
| 2016/0321654 | A1* | 11/2016 | Lesavich | G06F 16/9554 |
| 2017/0032456 | A1* | 2/2017 | Strauss | G06Q 30/0283 |
| 2017/0085555 | A1* | 3/2017 | Bisikalo | G06F 16/9535 |
| 2017/0111175 | A1* | 4/2017 | Oberhauser | H04L 63/08 |
| 2017/0116345 | A1* | 4/2017 | Cameron | G06F 16/24578 |
| 2017/0206603 | A1* | 7/2017 | Al-Masoud | G06Q 40/08 |
| 2017/0243212 | A1* | 8/2017 | Castinado | H04L 9/3236 |
| 2017/0372420 | A1* | 12/2017 | Albin | G06Q 30/06 |
| 2018/0089655 | A1* | 3/2018 | Mcdonald | G06Q 20/065 |
| 2018/0234433 | A1* | 8/2018 | Oberhauser | H04L 9/3236 |
| 2018/0247137 | A1* | 8/2018 | Boyle | G06Q 10/20 |
| 2019/0044703 | A1* | 2/2019 | Smith | G06N 3/063 |
| 2019/0050832 | A1* | 2/2019 | Wright | H04L 9/0643 |
| 2019/0180266 | A1* | 6/2019 | Sidhu | H04L 63/102 |

OTHER PUBLICATIONS

L. Beaudoin and P. Eng, "Asset Valuation Technique for Network Management and Security," Sixth IEEE International Conference on Data Mining—Workshops (ICDMW'06), 2006, pp. 718-721, doi: 10.1109/ICDMW.2006.32. (Year: 2006).*
U.S. Appl. No. 15/135,790 filed in the name of Stephen Todd et al. filed Apr. 22, 2016 and entitled "Data Valuation at Content Ingest."
U.S. Appl. No. 15/135,817 filed in the name of Stephen Todd et al. filed Apr. 22, 2016 and entitled "Data Value Structures."
U.S. Appl. No. 15/473,848 filed in the name of Misha Nossik et al. filed Mar. 30, 2017 and entitled "Distributed Ledger for Peer-to-Peer Cloud Resource Sharing."
U.S. Appl. No. 14/863,783 filed in the name of Stephen Todd et al. filed Sep. 24, 2015 and entitled "Unstructured Data Valuation."
U.S. Appl. No. 15/359,916 filed in the name of Stephen Todd et al. filed Nov. 23, 2016 and entitled "Automated Identification and Classification of Critical Data Elements."
Satoshi Nakamoto, "Bitcoin: A Peer-to-Peer Electronic Cash System," 2008, 9 pages.

* cited by examiner

DISTRIBUTED LEDGER FOR PEER-TO-PEER CLOUD DATA ASSET VALUATION

FIELD

The field relates generally to information processing systems, and more particularly to information processing systems comprising cloud infrastructure.

BACKGROUND

Information processing systems today commonly implement a cloud computing paradigm. Cloud computing is a model for enabling on-demand network access to a shared pool of configurable computing resources (e.g., compute, storage, input/output, and network) that can be rapidly provisioned and released with minimal management effort or service provider interaction. A given cloud infrastructure upon which data and one or more software programs (e.g., applications, services) are hosted is typically referred to as a "cloud." A "multi-cloud" architecture is one that employs multiple clouds in a single heterogeneous network architecture. Some cloud infrastructures are within the exclusive control and management of a given enterprise, and therefore are considered "private clouds." The term "enterprise" as used herein is intended to be broadly construed, and may comprise, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Examples of available public cloud infrastructures include, but are not limited to, Amazon Elastic Compute Cloud®, Google AppEngine®, and Windows Azure® Services Platform.

Many enterprises today find it cost effective to utilize a mix of public and private clouds to host their data, applications, and/or services. However, the use of public clouds and multi-cloud architectures in general limits or otherwise prevents enterprises from utilizing functionalities that they may otherwise have access to in their private cloud environment.

SUMMARY

Illustrative embodiments are configured to facilitate cloud data asset valuation through peer-to-peer implementation of a distributed ledger in a multi-cloud environment.

In one embodiment, an apparatus comprises at least one processing device having a processor coupled to a memory. The processing device is configured to implement a first ledger node of a first cloud. The first ledger node of the first cloud is configured to communicate over one or more networks with a plurality of additional ledger nodes associated with respective additional clouds. The first ledger node is further configured to obtain a transaction associated with a valuation of a data asset. The first ledger node is further configured to broadcast the valuation transaction to the additional ledger nodes. A cryptographic block characterizing at least the valuation transaction is generated and entered into a blockchain distributed ledger collectively maintained by the first and additional ledger nodes. The first and additional ledger nodes collectively maintain the blockchain distributed ledger on a peer-to-peer basis without utilizing a centralized transaction authority.

Advantageously, illustrative embodiments facilitate the use of valuation algorithms at multiple clouds to enable valuation functionalities across the multiple clouds. Various illustrative embodiments comprise multiple private clouds, multiple public clouds, and a mix of private and public clouds. Numerous alternative arrangements are possible.

These and other illustrative embodiments described herein include, without limitation, methods, apparatus, systems, and computer program products comprising processor-readable storage media.

DETAILED DESCRIPTION

Figure 1:
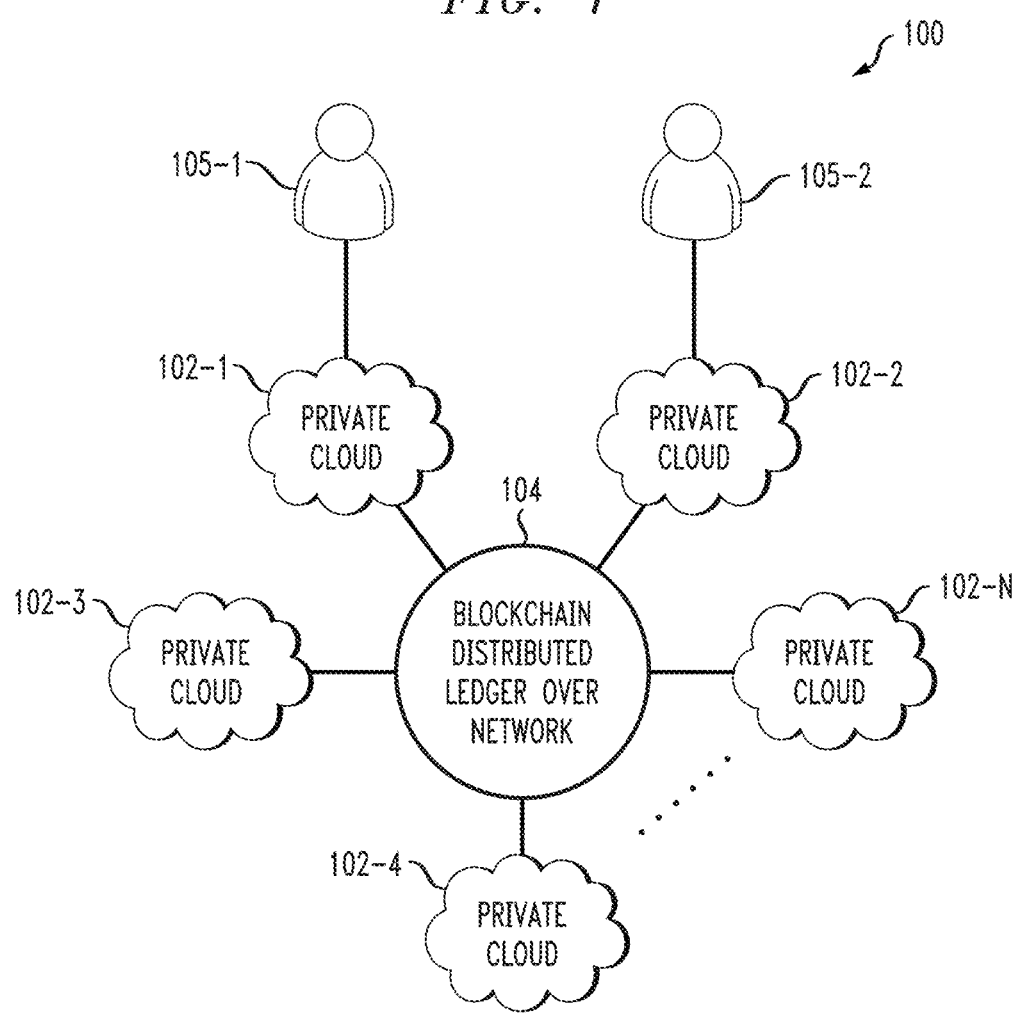
FIG. 1 is a block diagram of an information processing system comprising a distributed ledger for peer-to-peer cloud data asset valuation in an illustrative embodiment.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, multiple data centers wherein each data center includes a cloud infrastructure hosting multiple tenants that share cloud resources. Such systems are considered examples of what are more generally referred to herein as cloud computing environments.

It is realized herein that one of the functionalities that an enterprise has access to in a private cloud but not in a public cloud nor in a multi-cloud architecture is the capability to assign business value (valuation) to data assets stored within the cloud infrastructure. That is, some enterprises use analytics to generate metadata about data asset activities (e.g., ingest, analytic workflows), and store such metadata in a data lake hosted by a private cloud. This enables the maintenance of a data and analytic catalog (DAC) that tracks data lake assets. New business processes can be created (e.g., manual or automated) that can annotate catalogued assets with statements of value. Such a data lake, sometimes called a business data lake (BDL), serves as a centralized data location for storing, sharing, collaborating and analyzing data sets associated with the enterprise. This process works well for high-value data assets that are kept private within the confines of an enterprise's corporately owned data center. The reality, however, is that there are many business reasons to store data sets on public clouds such as, but not limited to, the above-mentioned Google AppEngine®, Windows Azure® Services Platform, and Amazon Elastic Compute Cloud® (by way of example only, persistent storage functionality in Amazon® cloud platforms can be provided by services such as Amazon Elastic Block® (EBS), Amazon Elastic File®, and Amazon Simple Storage Service® (S3)). Such reasons may include, for example, additional analytic capabilities, more extensive collaboration, and/or cost sensitivity.

Unfortunately, these public clouds do not enable the enterprise to execute valuation algorithms that provide the enterprise with valuable business (and technical) insight into their publicly-hosted data assets. This results in a distributed and non-valued portfolio of data assets.

More particularly, a data and analytic catalog (DAC, as mentioned above) is a locally built and maintained catalog that is typically a part of a private data lake solution. The application programming interfaces (APIs) available to annotate data assets with statements of value are not offered by third-party cloud providers in public cloud environments. Even assuming identical data catalog APIs were somehow made available across multi-cloud deployments, the APIs are not available as an overall cloud service that gives any application visibility into the value of each data asset.

Further, even if the above-mentioned DAC approach were to provide a centralized exchange to create a common view of the data assets of an enterprise, such a model would be inefficient for a number of reasons such as, for example: latency concerns as every valuation entry must undergo round-trip updates from the cloud to the exchange and back again; identity management across clouds is complex to manage; security threats resulting from hacking into the centralized exchange to destroy and/or modify data; and availability concerns in the face of exchange failure.

Still further, it is realized that a multi-cloud deployment of enterprise data assets leads to a lack of a catalogued awareness of how many distributed assets are in existence, and where they are located. In addition, any benefit gained by locally valuing data assets via a data catalog is diluted in the context of increased data placement and growth in public cloud deployments. There is no longer a portfolio-wide view of the value of these distributed data assets.

The lack of value tracking of public cloud data assets results in missed opportunities to capitalize on fluctuating data value. For example, if the potential value of data continually increases in a certain public cloud deployment, this increase will be missed and potential revenue lost. Similarly, if the value decreases or turns into a negative potential risk for a business, there is no ability to flag this scenario in order to protect against the risk.

In addition, it is realized herein that as data sits in a public cloud, it is doing so at a cost (public cloud computing costs). Without ongoing monitoring of the value that the data is bringing to the enterprise, it is not possible to continually monitor the choice of continuing to pay for public cloud data hosting fees for these data sets.

Without the ability to both track overall multi-cloud data set value and track overall cloud computing costs for those data sets, there is no ability to create a multi-cloud balance sheet for data which adds and/or subtracts these values together.

As data increases in value, it may be trapped in a cloud that does not currently have sufficient compute capability to extract that value for the business (e.g., through high-performance analytic algorithms). As a result, a business opportunity to allocate additional compute capability to extract that value is lost.

Illustrative embodiments overcome the above and other drawbacks by methodologies and systems that provide peer-to-peer cloud asset valuation with a distributed ledger (e.g., a valuation blockchain). A blockchain is a secure, immutable ledger that runs in a peer-to-peer distributed fashion.

Before describing details as to how the blockchain operates with respect to data asset valuation, illustrative embodiments below describe implementations of multi-cloud blockchain distributed ledger systems within which data asset valuation is performed. Further details of multi-cloud blockchain distributed ledger systems may be found in U.S. patent application Ser. No. 15/473,848, filed Mar. 30, 2017, entitled "Distributed Ledger for Peer-to-Peer Cloud Resource Sharing," the disclosure of which is incorporated herein in its entirety.

FIG. 1 shows an information processing system 100 comprising a plurality of clouds 102-1, 102-2, 102-3, 102-4, ... 102-N (e.g., a multi-cloud architecture). The clouds 102 in this embodiment are assumed to be private clouds of one or more enterprises. Each of the clouds 102 has one or more users. For example, clouds 102-1 and 102-2 have respective users 105-1 and 105-2. The clouds 102 have respective sets of cloud resources, such as compute, storage, input/output and network resources, in various configurations. For example, an enterprise may host its data, applications, and/or services on such a multi-cloud architecture. The clouds 102 interact with one another over one or more communications networks that are not explicitly shown in order to collectively implement a peer-to-peer blockchain distributed ledger 104.

Although the clouds 102 in this embodiment are illustratively implemented as respective private clouds, in other embodiments one or more of the clouds 102 may be public clouds. A wide variety of other private, public, hybrid multi-cloud arrangements can be used.

The clouds 102 in this embodiment are more particularly assumed to comprise respective ledger nodes, although the ledger nodes are not explicitly shown in this figure (further details of such ledger nodes will be illustrated below starting with FIG. 3). For example, the first cloud 102-1 is assumed to comprise a first ledger node, and the other clouds are assumed to comprise respective additional ledger nodes.

The first ledger node of the first cloud 102-1 is illustratively configured to communicate over the above-noted network(s) with the additional ledger nodes associated with respective additional ones of the clouds 102. The first and additional ledger nodes collectively maintain the blockchain distributed ledger 104. More particularly, the first and additional ledger nodes collectively maintain the blockchain distributed ledger 104 on a peer-to-peer basis without utilizing a centralized transaction authority.

The blockchain distributed ledger 104 collectively maintained by the ledger nodes of the respective clouds 102 illustratively provides a first ledger system that in some embodiments is configured to interface to one or more additional ledger systems maintained by respective sets of ledger nodes associated with other cloud groupings.

In operation, and as will be further illustrated in subsequent figures, the first ledger node of the first cloud 102-1 generates a valuation transaction. The valuation transaction is broadcast to the additional ledger nodes. A corresponding cryptographic block characterizing at least the valuation transaction is generated. The cryptographic block is then entered into the blockchain distributed ledger 104 collectively maintained by the first and additional ledger nodes. For example, the cryptographic block may be entered after designated amounts of verification computations are successfully performed on that block within the ledger system. Numerous other techniques can be used to allow one or more ledger nodes or other ledger system entities to enter cryptographic blocks characterizing respective valuation transactions into the blockchain distributed ledger 104.

The additional ledger nodes associated with respective ones of the other clouds 102 can also generate corresponding cryptographic blocks characterizing valuation transactions performed at corresponding clouds, in a manner similar to that described above for the first ledger node of the first cloud 102-1. These cryptographic blocks are also entered into the blockchain distributed ledger 104 collectively maintained by the first and additional ledger nodes of the respective first cloud 102-1 and additional clouds 102.

A blockchain distributed ledger in some embodiments is implemented at least in part in the form of a distributed database across a network that maintains a continuously-growing list of records more generally referred to herein as "blocks." Each block illustratively contains a timestamp and a link to a previous block. The blocks are generated using cryptographic techniques in order to allow each participant on the network to manipulate the blocks in a secure way without the need for a central authority.

For example, valuation transactions are entered as corresponding respective blocks into the distributed blockchain ledger, with each block referencing the previous block and being secured from tampering and revision through the use of designated cryptographic techniques. A given block is added to the blockchain distributed ledger only after successful cryptographic verification.

In some embodiments, any system user or other entity can verify the information in a given block by processing a signature in a block header using a public key of a corresponding account. However, only the "owner" of the corresponding account of the given block has the private key that allows full access to the block contents. The addition of new blocks to the blockchain distributed ledger may be advertised to all appropriate system entities.

The blockchain distributed ledger is illustratively configured to provide transparency and immutability of valuation transactions in that changes to the blockchain distributed ledger are viewable by all permissioned participants and the corresponding transactions cannot be altered or deleted. Overhead costs are significantly reduced in these and other illustrative embodiments by eliminating the need for a centralized authority or other similar third party intermediary.

One or more cryptographic block techniques adapted from bitcoin implementations may be employed in some embodiments. In bitcoin, the blockchain contains a record of all previous transactions that have occurred in the bitcoin network. The growth in popularity and usage of electronic cash systems such as bitcoin is in large part due to the underlying blockchain protocol, which allows for two parties in a computer network to transact directly with each other without a trusted third party. The bitcoin system was first described in S. Nakamoto, "Bitcoin: A Peer to Peer Electronic Cash System," 2008, the disclosure of which is incorporated by reference herein in its entirety.

The clouds 102 and other clouds referred to herein are illustratively implemented by cloud infrastructure comprising one or more processing platforms. The term cloud as used herein is intended to be more broadly construed and may comprise a private cloud, a public cloud, a hybrid cloud or combinations of multiple clouds of different types.

The cloud resources implemented by the clouds 102 can include container-based compute functionality and associated storage systems. Such storage systems in some embodiments are configured to store data under the control of its associated entity and are assumed to be part of the corresponding cloud.

A given one of the clouds 102 illustratively comprises a plurality of host devices configured to support execution of applications on behalf of multiple users, although such host devices are not explicitly shown in the figure. For example, the host devices of a given one of the clouds 102 may comprise respective container host devices. Cloud native applications can execute in respective application containers implemented utilizing the container host devices. The container host devices may comprise Docker containers, LXD containers, Cloud Foundry Diego-based containers or other types of containers. These and other host devices are examples of what are more generally referred to herein as "processing devices."

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

One or more of the clouds 102 can each be implemented using a layered architecture. For example, such a cloud can comprise a Platform-as-a-Service (PaaS) layer overlying an Infrastructure-as-a-Service (IaaS) layer. The IaaS layer may illustratively comprise a plurality of virtual machines configured to support application containers or other containers of the PaaS layer of the cloud.

A storage system of a given one of the clouds 102 illustratively includes at least one storage platform implementing one or more of block storage, object storage and file storage, although additional or alternative types of storage platforms can be used in other embodiments. The block storage may be implemented using a software-defined storage product such as ScaleIO™ to provide a virtual storage area network (vSAN). The object storage may be implemented using a cloud storage product such as Elastic Cloud Storage (ECS). The file storage may be implemented using Isilon® platform nodes and associated accelerators in the S-Series, X-Series and NL-Series product lines. The above-mentioned storage products are from Dell EMC of Hopkinton, Mass.

Different combinations of these and numerous other storage products can also be used in implementing a given storage platform in an illustrative embodiment. Additional examples of storage products that may be used in other embodiments include VNX® and Symmetrix VMAX® storage arrays, flash-based storage arrays such as DSSD™ and XtremIO™, object-based storage products such as Atmos®, and software-defined storage products such ViPR®, also from Dell EMC.

As mentioned previously, the blockchain distributed ledger 104 collectively maintained by the ledger nodes of the respective clouds 102 may provide a first ledger system that is configured to interface to one or more additional ledger systems maintained by respective sets of ledger nodes associated with other cloud groupings.

Figure 2:
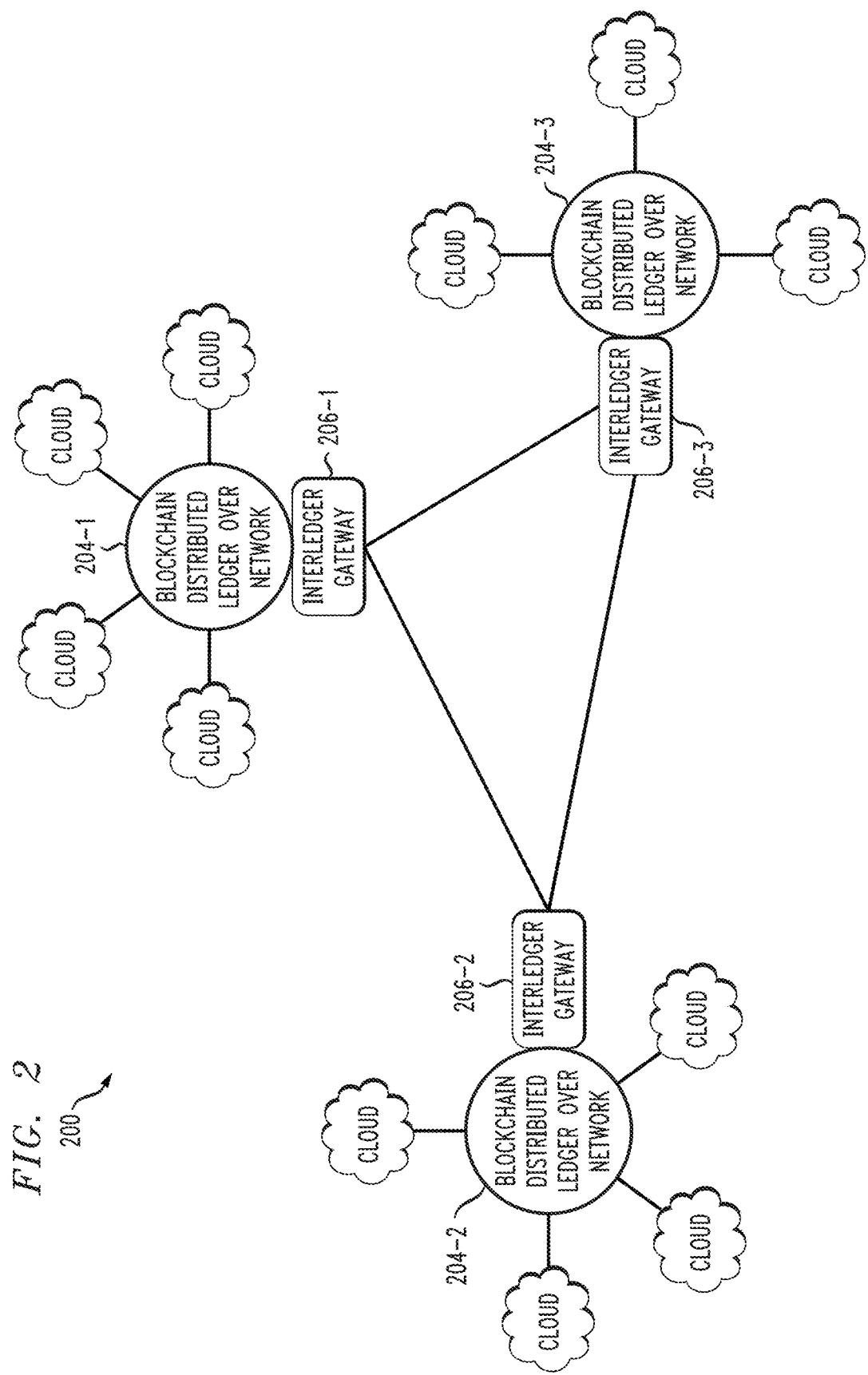
FIG. 2 is a block diagram of an information processing system in which multiple distinct ledger systems of the type shown in FIG. 1 are interfaced to one another via respective interledger gateways.

An example of an embodiment of this type is illustrated in FIG. 2. In the FIG. 2 embodiment, an information processing system 200 comprises a plurality of distinct ledger systems, each comprising a corresponding blockchain distributed ledger maintained collectively by an associated plurality of clouds. The system 200 in this example more particularly comprises first, second and third blockchain distributed ledgers 204-1, 204-2 and 204-3 each associated with a separate group of multiple clouds. The blockchain distributed ledgers 204-1, 204-2 and 204-3 are interfaced to one another via respective interledger gateways 206-1, 206-2 and 206-3 as illustrated.

Each of the blockchain distributed ledgers 204 and the ledger nodes of its respective clouds collectively provide a distinct ledger system that is interfaced via a corresponding one of the interledger gateways 206 to additional ledger systems. The additional ledger systems are each collectively maintained by a different group of clouds and have respective additional blockchain distributed ledgers 204. Each of the ledger systems comprises a corresponding one of the interledger gateways 206 configured to support communication between that ledger system and other ones of the ledger systems. The interledger gateways 206 therefore interconnect multiple ledger systems to form a larger decentralized peer-to-peer cloud system with secure sharing of cloud resources between the clouds.

The interledger gateways 206 are illustratively configured to allow data to be passed between the different ledger systems. For example, the interledger gateways can be configured to provide transactional integrity to interledger transactions spanning several distinct blockchain distributed ledgers associated with respective ones of the ledger systems.

The functionality of a given one of the interledger gateways 206 may be implemented in a separate node or other processing device associated with one of the clouds that maintains the corresponding blockchain distributed ledger 204-1, 204-2 or 204-3. Alternatively, such functionality may be implemented in a distributed manner over multiple nodes of respective ones of the clouds that maintain the corresponding blockchain distributed ledger 204-1, 204-2 or 204-3. For example, in some embodiments, the interledger gateway functionality of a blockchain distributed ledger can be distributed over ledger nodes of respective clouds that maintain the corresponding blockchain distributed ledger. It is therefore possible in some embodiments that a ledger node of one of the clouds can additionally be utilized to implement at least a portion of an associated interledger gateway.

Although three blockchain distributed ledgers 204 and respective interledger gateways 206 are shown in FIG. 2, this is by way of illustrative example only, and more or fewer blockchain distributed ledgers and corresponding interledger gateways may be implemented in other embodiments.

Additional illustrative embodiments of information processing systems with distributed ledgers for peer-to-peer cloud asset valuation will now be described with reference to FIGS. 3-10.

Figure 3:
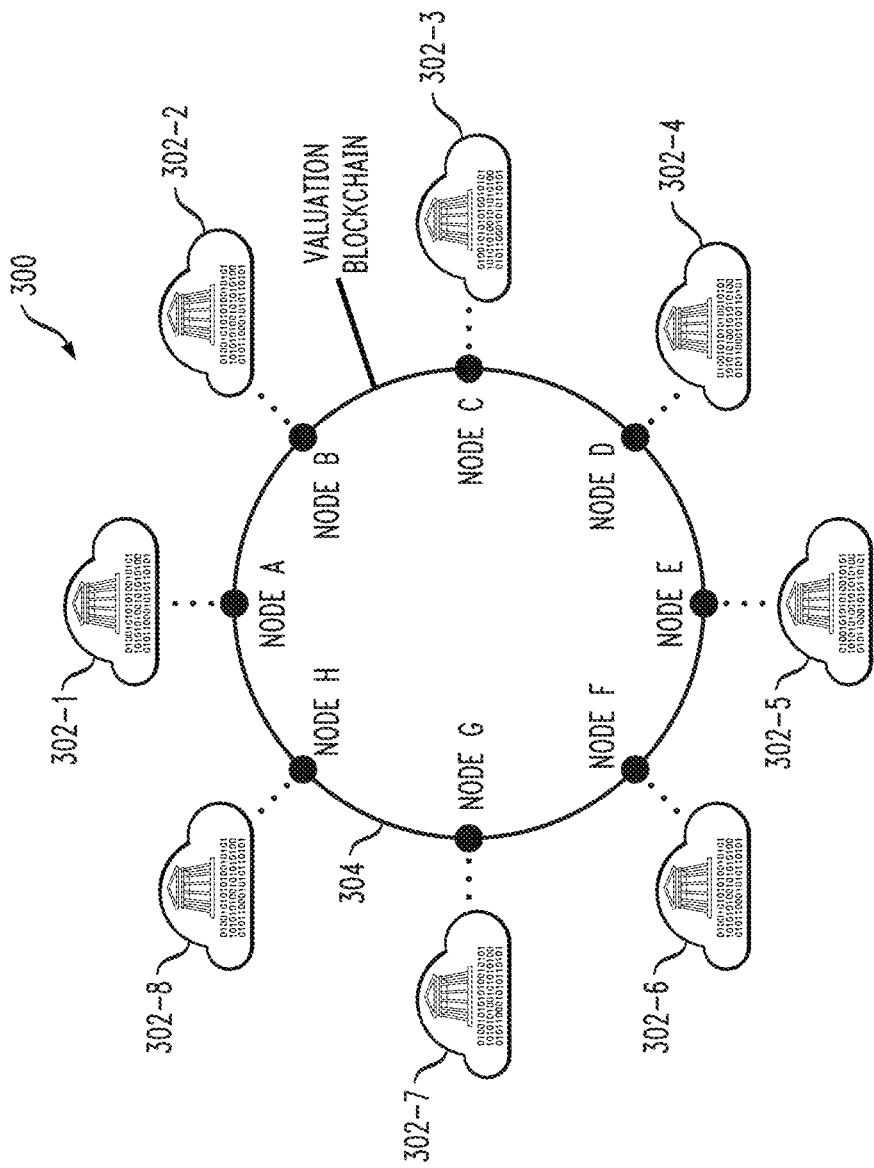
FIG. 3 is a block diagram of an information processing system comprising a distributed ledger for peer-to-peer cloud data asset valuation in an illustrative embodiment.

FIG. 3 shows an information processing system 300 comprising plurality of clouds 302-1, 302-2, 302-3, 302-4, 302-5, 302-6, 302-7, and 302-8 (e.g., a multi-cloud architecture or environment). The clouds 302 in this embodiment are assumed to be a mix of private clouds and public clouds (managed by third-party cloud providers, e.g., Amazon®, Google®, etc.) which host data, applications, and/or services of one or more enterprises (e.g., users not expressly shown). Alternatively, clouds 302 can be all public clouds or all private clouds.

The clouds 302 in this embodiment comprise respective ledger nodes, i.e., cloud 302-1 comprises ledger node A, 302-2 comprises ledger node B, 302-3 comprises ledger node C, 302-4 comprises ledger node D, 302-5 comprises ledger node E, 302-6 comprises ledger node F, 302-7 comprises ledger node G, and 302-8 comprises ledger node H.

Each ledger node is configured to communicate with the other ledger nodes over the same or similar network(s) as the above-noted network(s). Each ledger node may be implemented on one or more host devices or processing devices of its corresponding cloud. Additionally or alternatively, one or more ledger nodes may be implemented on host devices or processing devices separate from their corresponding cloud. The ledger nodes A through H collectively maintain the blockchain distributed ledger 304. More particularly, the ledger nodes A through H collectively maintain the blockchain distributed ledger 304 on a peer-to-peer basis without utilizing a centralized transaction authority. It is to be understood that the number of clouds 302 and the number of ledger nodes in FIG. 3 are intended to be exemplary and thus more or less clouds and/or more or less ledger nodes may be used to implement information processing system 300.

The blockchain distributed ledger 304 collectively maintained by the ledger nodes A through H of the respective clouds 302 illustratively provides a first ledger system that in some embodiments is configured to interface to one or more additional ledger systems maintained by respective sets of ledger nodes associated with other cloud groupings.

In this embodiment, each cloud instantiation (302) has access to a local ledger node (one of ledger nodes A through H) which may also be referred to as a "valuation blockchain node." Any valuation transactions stored on this local node are broadcast to all participating permissioned valuation blockchain nodes. The term "permissioned" as illustratively used herein means that valuation blockchain transactions are not publicly visible (as opposed to the public and open ledgers used in electronic currency blockchain implementations such as bitcoin). Thus, information processing system 300 depicts a set of multiple (private/public/hybrid) cloud data stores that have access to a common permissioned valuation blockchain. By leveraging the valuation blockchain depicted in FIG. 3, a wide variety of useful approaches and benefits can be realized by an enterprise.

Once a valuation blockchain node has been made accessible to each cloud deployment, a scan of all existing data assets can be conducted (if desired) and an initial value entered for each asset. A number of different valuation methods can be used, including but not limited to, the unstructured tokenization algorithms described in U.S. Ser. No. 14/863,783, filed Sep. 24, 2015, entitled "Unstructured Data Valuation," the disclosure of which is incorporated herein in its entirety. Instead of placing a key/value pair into a valuation table, however, a blockchain transaction is formed, as described above, and broadcast to the rest of the nodes in the network.

Figure 4:
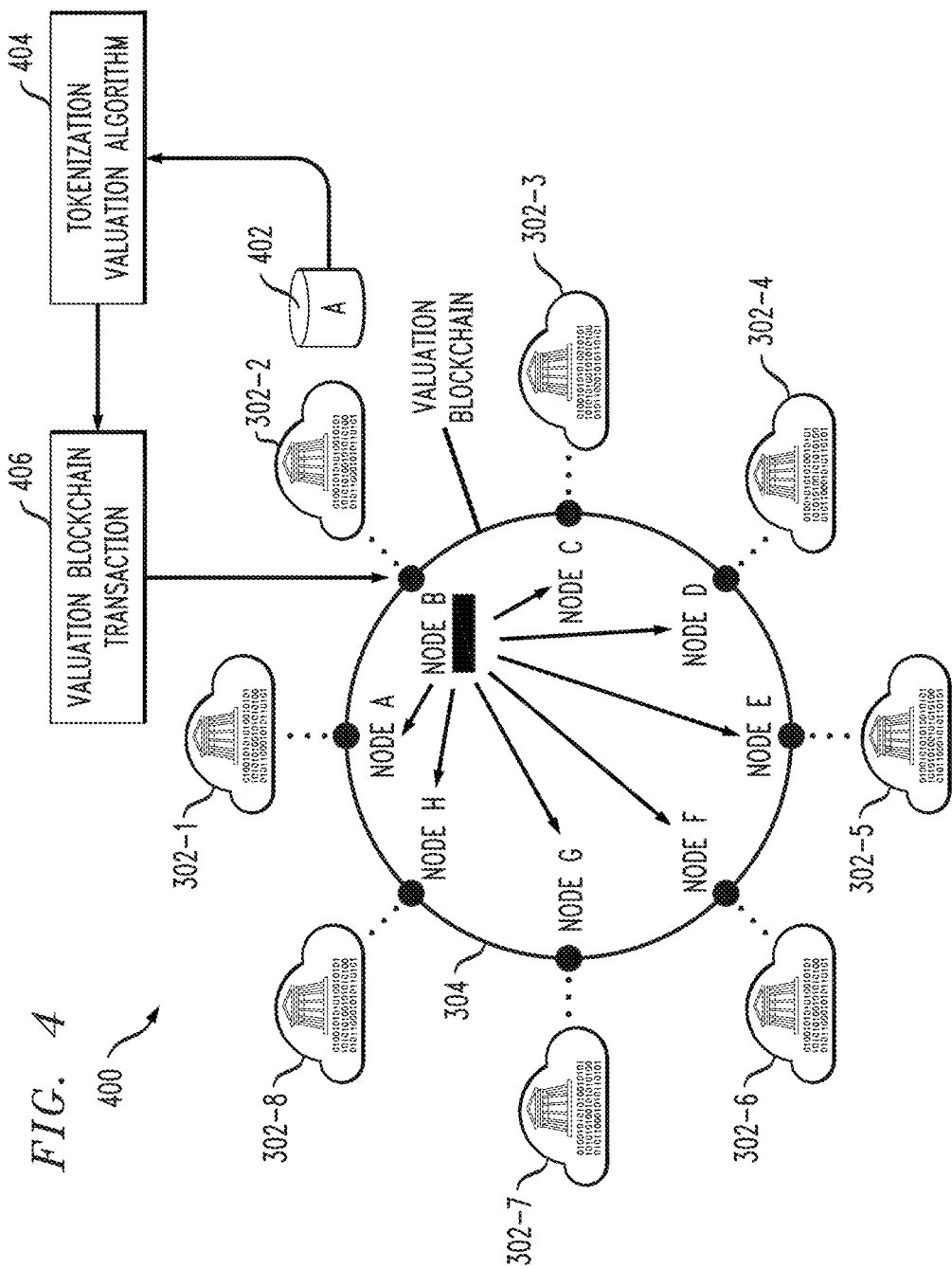
FIG. 4 is a block diagram illustrating further details of an information processing system comprising a distributed ledger for peer-to-peer cloud data asset valuation in an illustrative embodiment.

FIG. 4 illustrates the information processing system 300 (FIG. 3) with a discovery use case 400 where a data set 402 (data set A) stored in cloud 302-2 is analyzed by a valuation algorithm 404 (e.g., an unstructured tokenization algorithm as mentioned above) to create an initial value. A first step in this illustrative process is to assign a unique identifier (ID) to the data asset (data set A). This may be generated through any number of methods including, but not limited to, cryptographic hash, random ID generation, or a decentralized identifier assignment algorithm. A valuation blockchain transaction 406 is then created, e.g., data set A with unique ID "A" is being initialized into the blockchain distributed ledger 304 with value "xyz". This valuation blockchain transaction 406 is provided to the local valuation blockchain node (node B). The blockchain protocol then broadcasts this transaction throughout the network to all associated permissioned valuation blockchain nodes (e.g., from node B to the other nodes A and C-H), and all nodes go through the process of eventually recording the transaction in the ledger as a cryptographically generated block characterizing at least the subject transaction. In some illustrative embodiments, a cryptographic block contains more than one valuation transaction.

Figure 5:
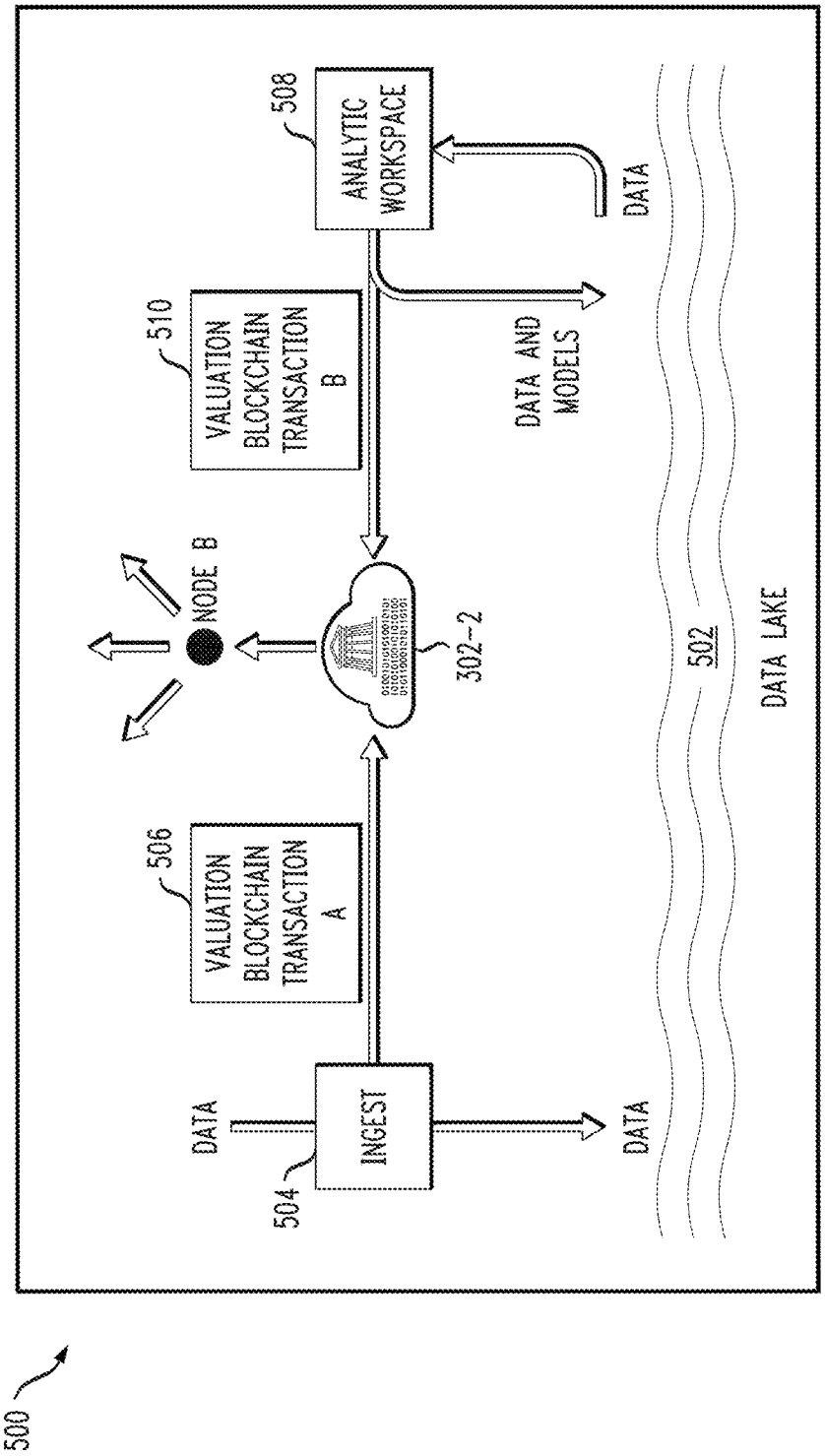
FIG. 5 is a block diagram illustrating further details of an information processing system comprising a distributed ledger for peer-to-peer cloud data asset valuation in an illustrative embodiment.

In one or more embodiments, as new data streams into any cloud 302 in the multi-cloud deployment, ingest valuation algorithms leverage the local valuation blockchain node to register the new data and assign an initial value. FIG. 5 illustrates a part 500 of the information processing system 300 (i.e., cloud 302-2 and valuation blockchain node B in FIG. 3) and the creation of new valuation blockchain transactions on data ingest and data analytic output.

For example, as data is ingested into the data lake 502 associated with cloud 302-2, an ingest valuation algorithm 504 is used to value the ingested data. Examples of ingest valuation algorithms include, but are not limited to, the streaming data ingest algorithms described in U.S. patent application Ser. No. 15/135,790, filed Apr. 22, 2016, entitled "Data Valuation at Content Ingest," the disclosure of which is incorporated herein in its entirety. The ingest valuation algorithm 504 generates a valuation blockchain transaction A (506). This transaction 506 is entered into the local valuation blockchain node (node B) which generates a cryptographic block characterizing the valuation blockchain transaction A. The blockchain protocol then broadcasts this transaction throughout the network to all associated permissioned valuation blockchain nodes, and all nodes go through the process of eventually recording the transaction in the ledger.

Similarly, as analytic workflows are executed in workspace 508 on data from the data lake 502, new data sets (e.g., intermediate driver data sets or end user data sets) are generated with associated value. Examples of analytic output valuation algorithms include, but are not limited to, the valuation algorithms described in U.S. patent application Ser. No. 15/135,817, filed Apr. 22, 2016, entitled "Data Value Structures," the disclosure of which is incorporated herein in its entirety. This value is used to generate a new valuation blockchain transaction B (510). This transaction 510 is entered into the local valuation blockchain node (node B) which generates a cryptographic block characterizing the valuation blockchain transaction. The blockchain protocol then broadcasts this transaction throughout the network to all associated permissioned valuation blockchain nodes, and all nodes go through the process of eventually recording the transaction in the ledger.

It is to be further understood that an existing data set may increase in value for any number of reasons, which requires that this change in value be recorded on the distributed ledger 304. In one or more embodiments, the change in value can be recorded by leveraging back pointer or chaining capabilities of a blockchain. Every transaction on the ledger 304 has a unique hash value associated with it, and this hash value can be referenced as containing the "current value" of the data asset. A new blockchain transaction can be created for that data asset which contains a new value. This new value can be stated as a replacement value or it can represent some positive or negative increment from the previous value. This increase in value could happen, for example, as multiple data scientists from across the enterprise begin importing this data set into their analytic workspaces and publishing new data assets as a result.

Furthermore, in one or more embodiments, instead of relying on a proprietary valuation API (i.e., a vendor's data and analytic catalog), data value annotation through the techniques described above for distributed valuation can occur through a common, open mechanism (e.g., an open-source distribution of a blockchain implementation).

Figure 6:
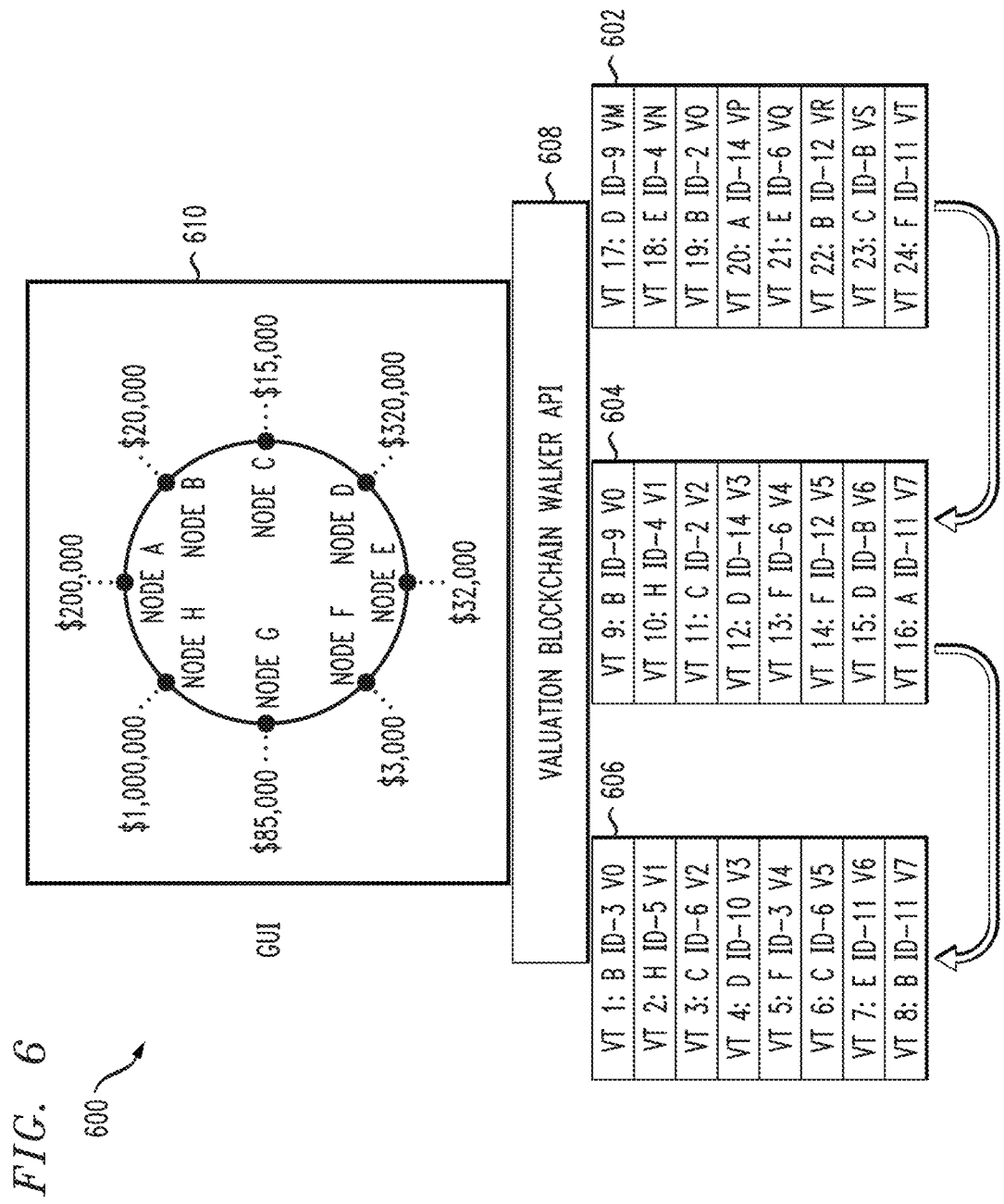
FIG. 6 is a block diagram of a multi-cloud data asset valuation interface in an illustrative embodiment.
Figure 7:
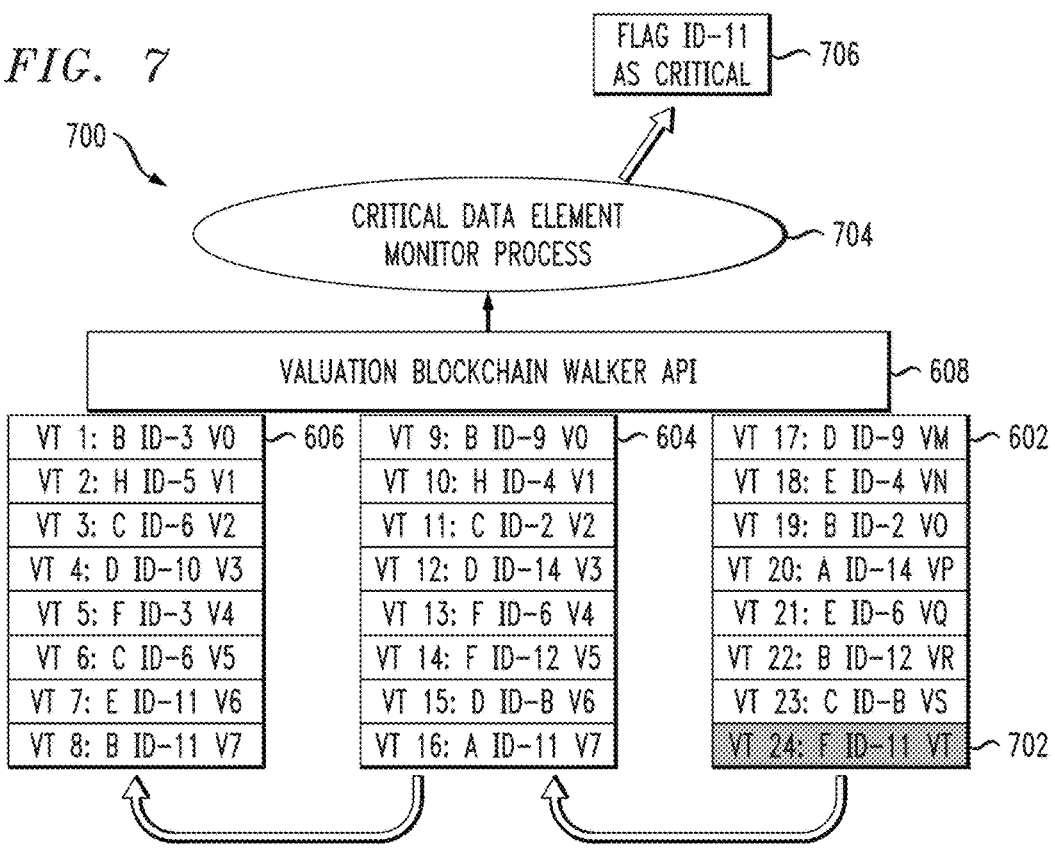
FIG. 7 is a block diagram of automated multi-cloud valuation logic in an illustrative embodiment.

That is, instead of trying to create a common, centralized portfolio view of the value of distributed data assets, each transaction blockchain node (A through H) in the multi-cloud deployment now stores an identical, common view of the value of every multi-cloud data asset that has been entered into the ledger 304. A portfolio view of all assets can be achieved by simply "walking" (traversing) the ledger that is available on any node in the network. FIG. 6 illustrates an example dashboard 600 that calls valuation blockchain walker logic via the valuation blockchain ledger 304. The blockchain in FIG. 6 represents a series of valuation transactions that have been grouped into blocks 602, 604, and 606, with the areas on the bottom of each block providing the links that allow a walking algorithm to scan through all transactions (i.e., go from block to block). The API 608 (valuation blockchain walker logic or traversal logic) provides a graphical user interface (GUI) 610 with a visualization of a value representation of all data from every node using, for example, an economic value of information (EVI) approach to list the value in dollars. Note that in illustrative embodiments the transactions in the distributed ledger 304 have fields within them, such as:

VT<N>: where "N" indicates that this is the "Nth" transaction in the overall ledger;

<letter>: indicates the blockchain valuation node that originated the transaction;

ID-<x>: indicates the unique ID of the data asset being valued; and

V<y>: indicates the value assigned to the data asset.

Thus, each entry in blocks 602, 604, and 606 is represented via the above-defined fields (e.g., VT 8: B ID-11 V7).

In addition to generating a singular graphical view (610) of data asset valuation across a multi-cloud deployment, in one or more embodiments, multi-cloud business logic is executed on one or more valuation blockchain nodes (one or more of ledger nodes A through H) in the network to take action based on changes in value that are recorded by any node into the blockchain distributed ledger 304. This example is illustrated as 700 in FIG. 7. For example, if the $24^{th}$ entry (702) in the ledger highlights the fact that Hybrid Cloud F has assigned a value of "T" to data set ID-11, this value "T" may cross a threshold which identifies that this data asset has become critical and the data quality needs to be checked. An automated business process 704 (e.g., critical data element (CDE) monitoring process) detects this threshold change and emits a notification or takes some other action to flag (706) the CDE.

What is "critical" to an enterprise depends on the nature of the enterprise, and can be specifically defined by a given enterprise. A CDE for an enterprise may be a data element that is important to the enterprise because some condition attributable to the data element can have an appreciable consequence on the enterprise. By way of non-limiting example, a CDE can be a data element that represents a potential risk to the enterprise (e.g., due to the fact that the data quality is low) and/or a potential lost opportunity to the enterprise (e.g., due to the fact that the importance of the data to the enterprise goes undetected). By way of example only, the CDE monitoring process may utilize one or more CDE identification techniques described in U.S. patent application Ser. No. 15/359,916, filed Nov. 23, 2016, entitled "Automated Identification and Classification of Critical Data Elements," the disclosure of which is incorporated herein in its entirety.

Furthermore, another benefit of the data asset valuation approach described herein is that valuation tracking in a multi-cloud environment can be implemented without concern for many of the problems mentioned above in existing systems. For example, blockchain implementations handle many multi-cloud failure scenarios (nodes that become unavailable or come and go), and the ledger 304 itself is immutable (to prevent against malicious attempts to edit or change the value).

Figure 8:
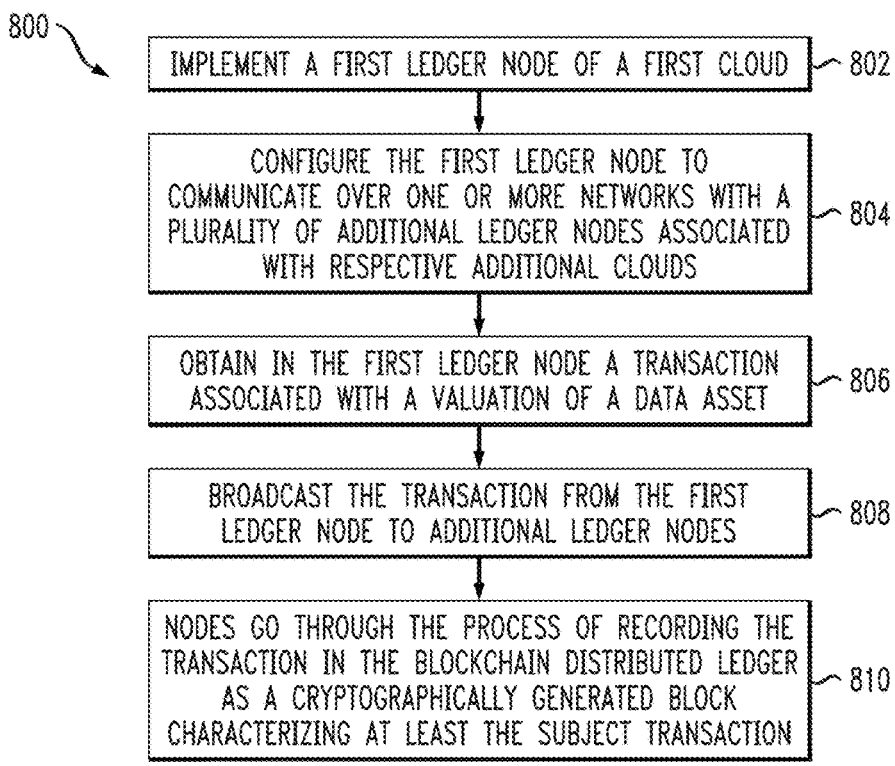
FIG. 8 illustrates a methodology for providing peer-to-peer cloud data asset valuation in an illustrative embodiment.

FIG. 8 illustrates a methodology 800 for providing peer-to-peer cloud data asset valuation in an illustrative embodiment. As shown, in step 802, the methodology implements a first ledger node of a first cloud. In step 804, the first ledger node is configured to communicate over one or more networks with a plurality of additional ledger nodes associated with respective additional clouds. In step 806, the first ledger node obtains a transaction associated with a valuation of a data asset. In step 808, the valuation transaction is broadcast to the additional ledger nodes. In step 810, the nodes go through the process of eventually recording the transaction in the ledger as a cryptographically generated block characterizing at least the subject transaction. In some illustrative embodiments, a cryptographic block contains more than one valuation transaction. Thus, advantageously, the first and additional ledger nodes collectively maintain the blockchain distributed ledger on a peer-to-peer basis without utilizing a centralized transaction authority.

At least portions of the architecture of information processing systems described herein may be implemented using one or more processing platforms. Illustrative embodiments of such platforms will now be described in greater detail in conjunction with FIGS. 9 and 10. Although described primarily in the context of information processing systems 100, 200, and 300, these platforms may also be used to implement at least portions of other information processing systems in other embodiments of the invention.

Figure 9:
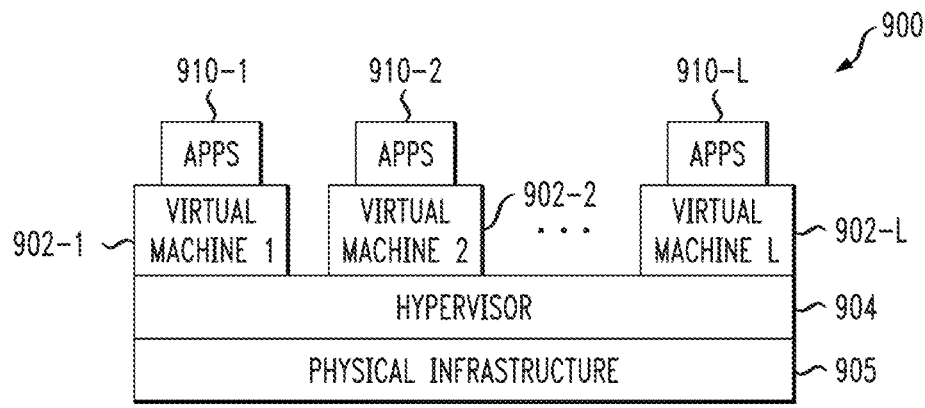
FIGS. 9 and 10 show examples of processing platforms that may be utilized to implement at least a portion of an information processing system in illustrative embodiments.
Figure 10:
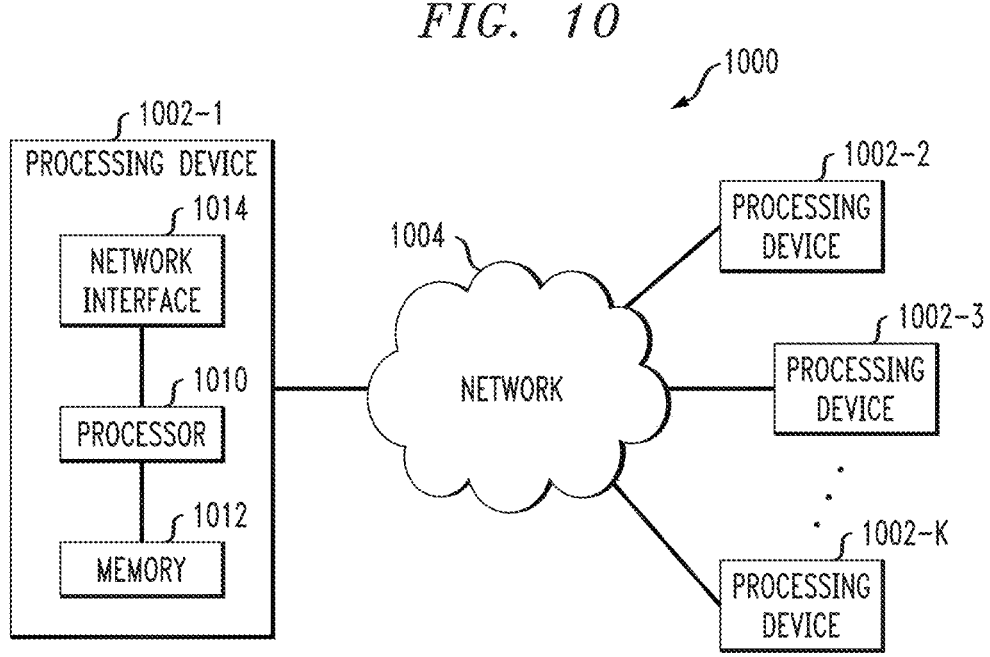

FIG. 9 shows an example processing platform comprising cloud infrastructure 900. The cloud infrastructure 900 comprises a combination of physical and virtual processing resources that may be utilized to implement at least a portion of the information processing systems 100, 200, and 300. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

These and other types of cloud infrastructure can be used to implement one or more system components/steps, such as the components/steps shown in FIGS. 1-8.

Although only a single hypervisor 904 is shown in the embodiment of FIG. 9, the information processing systems may of course include multiple hypervisors each providing a set of virtual machines using at least one underlying physical machine. Different sets of virtual machines provided by one or more hypervisors may be utilized in configuring multiple instances of various components of the information processing systems.

An example of a commercially available hypervisor platform that may be used to implement hypervisor 904 and possibly other portions of the information processing systems in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via Peripheral Component Interconnect Express (PCIe) connections. Numerous other configurations are possible for a given storage system or other related components of the information processing systems.

As is apparent from the above, one or more of the processing modules or other components of the information processing systems illustrated in the figures and otherwise described above may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of the information processing systems and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks. Some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA) or other type of processing circuitry, as well as portions or combinations of such circuitry elements. The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionalities. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor. As another example, portions of a given processing platform in some embodiments can comprise converged infrastructure such as VxRail™, VxRack™ or Vblock® converged infrastructure commercially available from Dell EMC. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing systems described herein. Such components can communicate with other elements of an information processing system over any type of network or other communication media.

As indicated previously, components of an information processing system as disclosed herein can be implemented at least in part in the form of one or more software programs stored in memory and executed by a processor of a processing device. For example, at least portions of ledger nodes, a blockchain distributed ledger, clouds, valuation algorithms, monitor processes, APIs, or other component of an information processing system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   wherein the processing device is configured to implement a first ledger node of a first cloud;
   the first ledger node of the first cloud being configured:
   to communicate over one or more networks with one or more additional ledger nodes associated with respective additional clouds;
   to obtain a transaction associated with a valuation of a given data asset;
   to broadcast the transaction associated with the valuation of the given data asset to the one or more additional ledger nodes;
   to generate a cryptographic block characterizing at least the transaction associated with the valuation of the given data asset;
   to enter the generated cryptographic block into a blockchain distributed ledger collectively maintained by the first ledger node and the one or more additional ledger nodes;
   to generate a visualization at the first ledger node by executing blockchain distributed traversal logic in the blockchain distributed ledger, the generated visualization representing multiple valuation results computed for a plurality of data assets stored in the first cloud and the additional clouds, the plurality of data assets comprising the given data asset and one or more additional data assets;

to monitor the blockchain distributed ledger for one or more additional cryptographic blocks characterizing one or more changes in valuation of the plurality of data assets, wherein at least one of the one or more changes characterizes change in valuation of the given data asset resulting from (i) importing the given data asset into analytic workspaces and (ii) creation of one or more additional ones of the plurality of data assets resulting from analytic workflows performed in the analytic workspaces using the given data asset;

to identify one or more of the plurality of data assets as critical in the blockchain distributed ledger based at least in part on detecting at least a threshold change in valuations of said one or more of the plurality of assets; and responsive to identifying said one or more of the plurality of data assets as critical in the blockchain distributed ledger, to migrate at least one of said one or more of the plurality of assets at least one of from the first cloud to one of the additional clouds and from one of the additional clouds to the first cloud;

wherein the multiple valuation results of the generated visualization comprise, for each of the first ledger node and the one or more additional ledger nodes, a representation of a total value of a subset of the plurality of data assets that is stored in each of a corresponding one of the first cloud and the additional clouds and wherein each subset comprises multiple data assets.

2. The apparatus of claim 1, wherein at least a subset of the first and additional clouds comprise respective public clouds or respective private clouds.

3. The apparatus of claim 1, wherein the transaction associated with the valuation of the given data asset is obtained via execution of a valuation algorithm on at least one data set associated with the first cloud.

4. The apparatus of claim 3, wherein the valuation algorithm is configured to generate a value for the at least one data set upon ingest to the first cloud.

5. The apparatus of claim 3, wherein the valuation algorithm is configured to provide a value for the at least one data set when already stored in the first cloud.

6. The apparatus of claim 3, wherein the valuation algorithm is configured to provide a value for an output of an analytic process performed on the at least one data set.

7. The apparatus of claim 3, wherein the transaction associated with the valuation of the given data asset comprises a unique identifier for the at least one data set and a value resulting from execution of the valuation algorithm.

8. The apparatus of claim 3, wherein an updated version of the transaction associated with the valuation of the given data asset is obtained via re-execution of the valuation algorithm on the at least one data set.

9. The apparatus of claim 8, wherein the first ledger node is further configured:

to generate a given one of the one or more additional cryptographic blocks characterizing the updated version of the transaction associated with the valuation of the given data asset; and to enter the given additional cryptographic block into the blockchain distributed ledger collectively maintained by the first ledger node and the one or more additional ledger nodes.

10. The apparatus of claim 9, wherein the updated version of the transaction associated with the valuation of the data asset represents a replacement for the corresponding prior transaction in the blockchain distributed ledger or a modification of the corresponding prior transaction in the blockchain distributed ledger.

11. The apparatus of claim 1, wherein the first ledger node and the one or more additional ledger nodes collectively maintain the blockchain distributed ledger on a peer-to-peer basis without utilizing a centralized transaction authority.

12. The apparatus of claim 1, wherein the blockchain distributed ledger collectively maintained by the first ledger node and the one or more additional ledger nodes of the respective first and additional clouds provides a first ledger system that interfaces to one or more additional ledger systems each collectively maintained by a different group of clouds and having respective additional blockchain distributed ledgers.

13. The apparatus of claim 12, wherein each of the first and additional ledger systems comprises an interledger gateway supporting communication between that ledger system and other ones of the ledger systems.

14. The method of claim 1, further comprising initiating one or more notifications responsive to identifying said one or more of the plurality of data assets as critical in the blockchain distributed ledger.

15. A method comprising:

implementing a first ledger node of a first cloud;

configuring the first ledger node to communicate over one or more networks with one or more additional ledger nodes associated with respective additional clouds;

obtaining in the first ledger node a transaction associated with a valuation of a given data asset;

broadcasting the transaction associated with the valuation of the given data asset to the one or more additional ledger nodes;

generating a cryptographic block characterizing at least the transaction associated with the valuation of the given data asset;

entering the generated cryptographic block into a blockchain distributed ledger collectively maintained by the first ledger node and the one or more additional ledger nodes;

generating a visualization at the first ledger node by executing blockchain distributed traversal logic in the blockchain distributed ledger, the generated visualization representing multiple valuation results computed for a plurality of data assets stored in the first cloud and the additional clouds, the plurality of data assets comprising the given data asset and one or more additional data assets;

monitoring the blockchain distributed ledger for one or more additional cryptographic blocks characterizing one or more changes in valuation of the plurality of data assets, wherein at least one of the one or more changes characterizes change in valuation of the given data asset resulting from (i) importing the given data asset into analytic workspaces and (ii) creation of one or more additional ones of the plurality of data assets resulting from analytic workflows performed in the analytic workspaces using the given data asset;

identifying one or more of the plurality of data assets as critical in the blockchain distributed ledger based at least in part on detecting at least a threshold change in valuations of said one or more of the plurality of assets; and responsive to identifying said one or more of the plurality of data assets as critical in the blockchain distributed ledger, migrating at least one of said one or more of the plurality of assets at least one of from the first cloud to one of the additional clouds and from one of the additional clouds to the first cloud;

wherein the multiple valuation results of the generated visualization comprise, for each of the first ledger node and the one or more additional ledger nodes, a representation of a total value of a subset of the plurality of data assets that is stored in each of a corresponding one of the first cloud and the additional clouds and wherein each subset comprises multiple data assets; and wherein the method is performed by at least one processing device comprising a processor coupled to a memory.

16. The method of claim 15, wherein:

the blockchain distributed ledger collectively maintained by the first ledger node and the one or more additional ledger nodes of the respective first and additional clouds provides a first ledger system that interfaces to one or more additional ledger systems each collectively maintained by a different group of clouds and having respective additional blockchain distributed ledgers; and each of the first and additional ledger systems comprises an interledger gateway supporting communication between that ledger system and other ones of the ledger systems.

17. A computer program product comprising a non-transitory processor-readable storage medium having stored therein program code of one or more software programs, wherein the program code when executed by at least one processing device comprising a processor coupled to a memory causes the processing device to:

to implement a first ledger node of a first cloud;

to configure the first ledger node to communicate over one or more networks with one or more additional ledger nodes associated with respective additional clouds;

to obtain in the first ledger node a transaction associated with a valuation of a given data asset;

to broadcast the transaction associated with the valuation of the given data asset to the one or more additional ledger nodes;

to generate a cryptographic block characterizing at least the transaction associated with the valuation of the given data asset;

to enter the generated cryptographic block into a blockchain distributed ledger collectively maintained by the first ledger node and the one or more additional ledger nodes;

to generate a visualization at the first ledger node by executing blockchain distributed traversal logic in the blockchain distributed ledger, the generated visualization representing valuation results computed for a plurality of data assets stored in the first cloud and the additional clouds, the plurality of data assets comprising the given data asset and one or more additional data assets;

to monitor the blockchain distributed ledger for one or more additional cryptographic blocks characterizing one or more changes in valuation of the plurality of data assets, wherein at least one of the one or more changes characterizes change in valuation of the given data asset resulting from (i) importing the given data asset into analytic workspaces and (ii) creation of one or more additional ones of the plurality of data assets resulting from analytic workflows performed in the analytic workspaces using the given data asset; and to identify one or more of the plurality of data assets as critical in the blockchain distributed ledger based at least in part on detecting at least a threshold change in valuations of said one or more of the plurality of data assets;

responsive to identifying said one or more of the plurality of data assets as critical in the blockchain distributed ledger, to migrate at least one of said one or more of the plurality of assets at least one of from the first cloud to one of the additional clouds and from one of the additional clouds to the first cloud;

wherein the multiple valuation results of the generated visualization comprise, for each of the first ledger node and the one or more additional ledger nodes, a representation of a total value of a subset of the plurality of data assets that is stored in each of a corresponding one of the first cloud and the additional clouds and wherein each subset comprises multiple data assets.

18. The computer program product of claim 17, wherein at least a subset of the first and additional clouds comprise respective public clouds.

19. The computer program product of claim 17, wherein at least a subset of the first and additional clouds comprise respective private clouds.

20. The computer program product of claim 17, wherein:

the blockchain distributed ledger collectively maintained by the first ledger node and the one or more additional ledger nodes of the respective first and additional clouds provides a first ledger system that interfaces to one or more additional ledger systems each collectively maintained by a different group of clouds and having respective additional blockchain distributed ledgers; and each of the first and additional ledger systems comprises an interledger gateway supporting communication between that ledger system and other ones of the ledger systems.

* * * * *